United States Patent
Kerr, Jr. et al.

[11] Patent Number: 6,146,191
[45] Date of Patent: Nov. 14, 2000

[54] CEILING FAN WITH EASY INSTALLATION FEATURES

[75] Inventors: Jack Russell Kerr, Jr., College Station; Cullyn B. Winn, Bryan, both of Tex.

[73] Assignee: Angelo Fan Brace Licensing, L.L.C., Philadelphia, Pa.

[21] Appl. No.: 09/360,268

[22] Filed: Jul. 26, 1999

[51] Int. Cl.$^7$ .................................................. H01R 13/62
[52] U.S. Cl. ........................ 439/537; 439/140; 439/316; 439/333; 439/286
[58] Field of Search ..................................... 439/537, 333, 439/334, 140, 141, 313, 314, 318, 286, 316

[56] References Cited

U.S. PATENT DOCUMENTS

| | | |
|---|---|---|
| D. 283,156 | 3/1986 | Mandelli et al. ...................... D23/158 |
| 484,911 | 10/1892 | Green . |
| 1,030,007 | 6/1912 | Miller . |
| 1,222,837 | 4/1917 | Winslow et al. . |
| 1,361,785 | 12/1920 | Tucker . |
| 1,506,522 | 8/1924 | Gansel . |
| 1,583,864 | 5/1926 | Tucker . |
| 1,595,972 | 8/1926 | De Reamer . |
| 1,636,278 | 7/1927 | Benjamin . |
| 1,666,223 | 4/1928 | Symmes . |
| 1,666,411 | 4/1928 | D'Olier, Jr. . |
| 1,701,935 | 2/1929 | Ryan . |
| 1,702,888 | 2/1929 | Balch . |
| 1,742,438 | 1/1930 | D'Olier, Jr. . |
| 1,796,036 | 3/1931 | Mangin . |
| 2,349,924 | 5/1944 | Anderson ................................ 248/343 |
| 2,355,913 | 8/1944 | Simon . |
| 2,414,173 | 1/1947 | Schuman ................................... 174/52 |
| 2,547,896 | 4/1951 | Wellen ..................................... 230/241 |
| 2,671,821 | 3/1954 | Zientowski et al. ...................... 174/54 |
| 2,766,434 | 10/1956 | Gear . |
| 2,933,240 | 4/1960 | Breese ..................................... 230/259 |
| 2,941,178 | 6/1960 | Hubbell et al. .......................... 439/333 |
| 3,017,469 | 1/1962 | Giller . |
| 3,302,918 | 2/1967 | Cohen ..................................... 248/343 |
| 3,356,840 | 12/1967 | Cohen ........................................ 240/78 |
| 3,401,874 | 9/1968 | Covington ............................... 230/241 |
| 3,523,267 | 8/1970 | Pauza ....................................... 439/333 |
| 4,098,547 | 7/1978 | Wrobel .................................. 339/91 R |
| 4,160,576 | 7/1979 | Vettori .................................. 339/119 R |
| 4,357,506 | 11/1982 | Breining ................................ 200/52 R |
| 4,515,538 | 5/1985 | Shih ........................................ 417/572 |
| 4,531,796 | 7/1985 | Gansert et al. ......................... 439/321 |
| 4,548,554 | 10/1985 | Angott .................................... 417/572 |
| 4,711,161 | 12/1987 | Swin, Sr. et al. ........................ 98/31.5 |
| 4,721,480 | 1/1988 | Yung ....................................... 439/527 |
| 4,776,761 | 10/1988 | Diaz ........................................... 416/5 |

(List continued on next page.)

FOREIGN PATENT DOCUMENTS

| | | |
|---|---|---|
| 674958 | 2/1930 | France . |
| 1331492 | 6/1965 | France . |
| 456372 | 2/1928 | Germany . |
| 5-157092 | 6/1993 | Japan . |
| 223834 | 12/1942 | Switzerland . |
| 2481 | of 1908 | United Kingdom ................... 439/333 |
| 182097 | 8/1923 | United Kingdom . |
| 1073791 | 6/1967 | United Kingdom . |
| 2149013 | 6/1985 | United Kingdom . |

*Primary Examiner*—Neil Abrams
*Attorney, Agent, or Firm*—Seidel, Gonda, Lavorgna & Monaco, PC

[57] ABSTRACT

The invention relates to the field of ceiling fans and includes a first plate (16) attached to a ceiling junction box and a plug plate (42) to be rotatably joined to the first plate and fixed in a final position by locking screws (70) that pass through apertures (64, 66) in one plate and into bores (38, 40) in the other plate. The locking screws (70) are usable to fix a fan bell to the plug plate. The plug plate (42) includes slidably engageable flat contact strips (204a, 204b). The plates include an initial orientation key (206) for fitting into an oval opening (214) and the first plate may include a spring biased shock protector for blocking access to live contacts (204a) when the plates are not connected. The plates (300, FIGS. 16, 17) may be formed in slidably adjustable sections for use with different size fan bells.

8 Claims, 16 Drawing Sheets

U.S. PATENT DOCUMENTS

| | | | |
|---|---|---|---|
| 4,808,071 | 2/1989 | Chau | 416/5 |
| 4,952,157 | 8/1990 | Hudson et al. | 439/537 |
| 5,069,601 | 12/1991 | Shawcross | 417/360 |
| 5,072,341 | 12/1991 | Huang | 362/96 |
| 5,094,676 | 3/1992 | Karbacher | 55/316 |
| 5,108,260 | 4/1992 | Monrose, III et al. | 416/142 |
| 5,180,284 | 1/1993 | Monrose, III et al. | 416/204 R |
| 5,242,269 | 9/1993 | Chang | 416/244 |
| 5,421,701 | 6/1995 | Funston | 415/5 |
| 5,567,117 | 10/1996 | Gunn et al. | 416/244 |
| 5,586,867 | 12/1996 | Mehlos | 417/45 |
| 5,658,129 | 8/1997 | Pearce | 416/5 |
| 5,738,496 | 4/1998 | Mehta | 417/44.1 |
| 5,762,223 | 6/1998 | Kerr, Jr. | 220/3.9 |
| 5,860,548 | 1/1999 | Kerr, Jr. | 220/3.2 |
| 5,900,583 | 5/1999 | Russo | 1784/61 |
| 5,951,197 | 9/1999 | Wu | 403/315 |
| 5,951,253 | 9/1999 | Gajewski | 416/214 |
| 5,954,304 | 9/1999 | Jorgensen | 248/200.1 |
| 5,954,449 | 9/1999 | Wu | 403/315 |
| 5,984,640 | 11/1999 | Wang | 416/244 R |

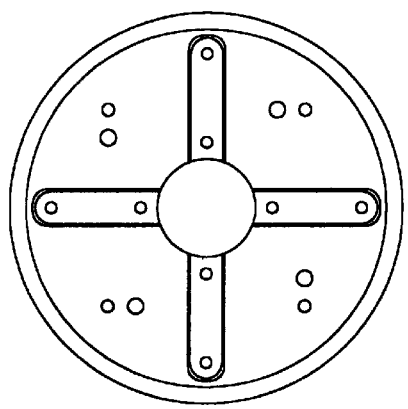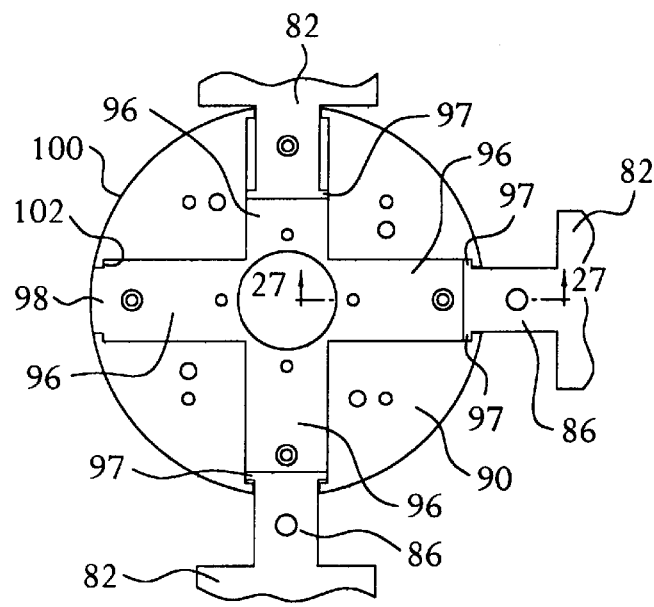
FIG. 23     FIG. 24
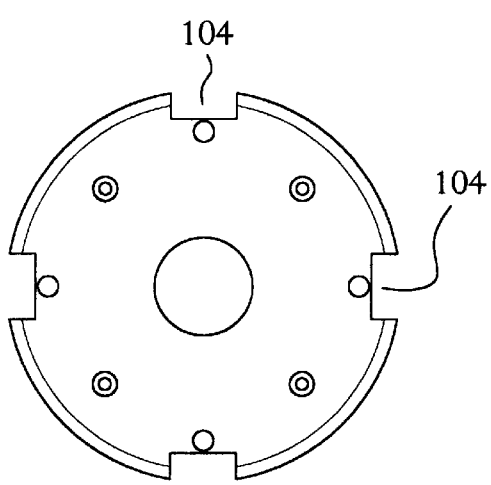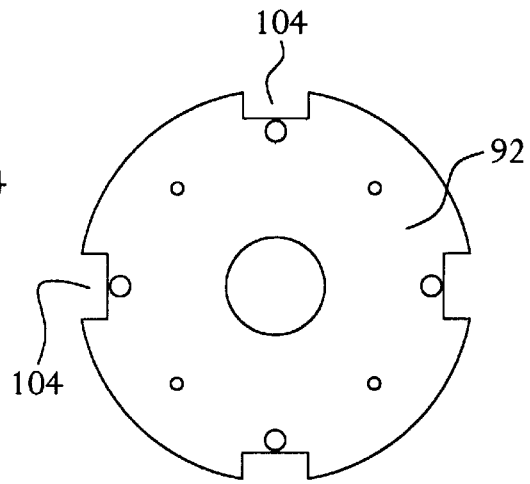
FIG. 25     FIG. 26

CEILING FAN WITH EASY INSTALLATION FEATURES

FIELD OF THE INVENTION

The present invention is directed to the general field of ceiling fans, and to the more specific field of ceiling fans with features that make easier the tasks of hanging and electrically connecting the fan, and the task of installing the fan blades.

BACKGROUND OF THE INVENTION

The installation of a ceiling fan is a difficult task for a single installer. To install a conventional ceiling fan, the fan is lifted to just below the electrical junction box and held there while connecting the fan wires to the electrical supply wires. After the electrical connection is finished, the fan is lifted further to place the fan bell over the junction box and held in that position while the fan is attached to the box or a ceiling hanger in some manner, typically with screws or bolts. The combined operation takes several minutes and usually requires two persons, one to lift and hold and the other to make the wire and screw connections.

To reduce the weight and profile of the fan while making the electrical and ceiling attachment, the fan blades are usually attached by screws to the drive ring hub after the fan is hung from the ceiling. Once the fan blades are attached to the fan, they are not easily removed.

SUMMARY OF THE INVENTION

The present invention provides an easily installed ceiling fan. The fan includes a quick connect device for electrically and physically mounting the fan to a ceiling, and an articulating blade assembly that allows the blades to be hung from the drive ring hub in a collapsed vertical orientation before the fan is hung from the ceiling, and then quickly snapped into the extended operating position.

A quick connect device of the present invention includes a first plate that is attachable to an electrical junction box and a second plate that is attachable to a fan. The first plate contains a first electrical contact and the second plate contains a second electrical contact. The second plate is rotatably coupled to the first plate to provide an electrical connection therebetween.

In a preferred embodiment, the quick connect device includes a receptacle plate wherein the first electrical contact is an electrical receptacle that can be connected to supply wires in the electrical junction box and a plug plate wherein the second electrical contact is an electrical plug of the type that mates with the receptacle, such as a three- or four-prong plug. The plug is rotatably mounted in the plug plate and is connected to electrical conductors for supplying electricity to the motor and any fan accessories. The receptacle plate and the plug plate are configured to secure one plate to the other by rotating one of the plates when the plug is inserted in the receptacle to align flanges in the ends of the plug plate to be inside of slots in the ends of the receptacle plate.

An articulating fan blade assembly of the present invention includes a drive ring hub, a fan blade and a lock. The drive ring includes at least one receiving slot. The fan includes a mounting portion extending from one end of the fan blade. The mounting portion includes a shaft configured for being received in the receiving slot. The lock retains the fan blade shaft within the receiving slot upon insertion of the shaft into the receiving slot.

More particularly, the articulating fan blade assembly includes a cylindrical rotary drive ring hub with fan blade receiving slots in the wall of the ring. The receiving slots are positioned equidistantly about the ring. Each fan blade has a mounting bracket extending from a root end of the blade. The mounting bracket includes a shaft configured for insertion into the receiving slot.

BRIEF DESCRIPTION OF THE DRAWINGS

For purposes of illustrating the invention, the drawings show one or more forms in which the invention can be embodied. The invention is not, however, limited to the precise forms shown unless such limitation is expressly made in a claim.

FIG. 23 is a top plan view of a cover of a drive ring of a ceiling fan of the present invention.

FIG. 24 is a bottom plan view of the drive ring of FIG. 23.

FIG. 25 is a top plan view of a portion of a drive ring of a ceiling fan in accordance with the present invention.

FIG. 26 is a bottom plan view of the portion of the drive ring of FIG. 25.

DETAILED DESCRIPTION OF THE INVENTION

Figure 1:
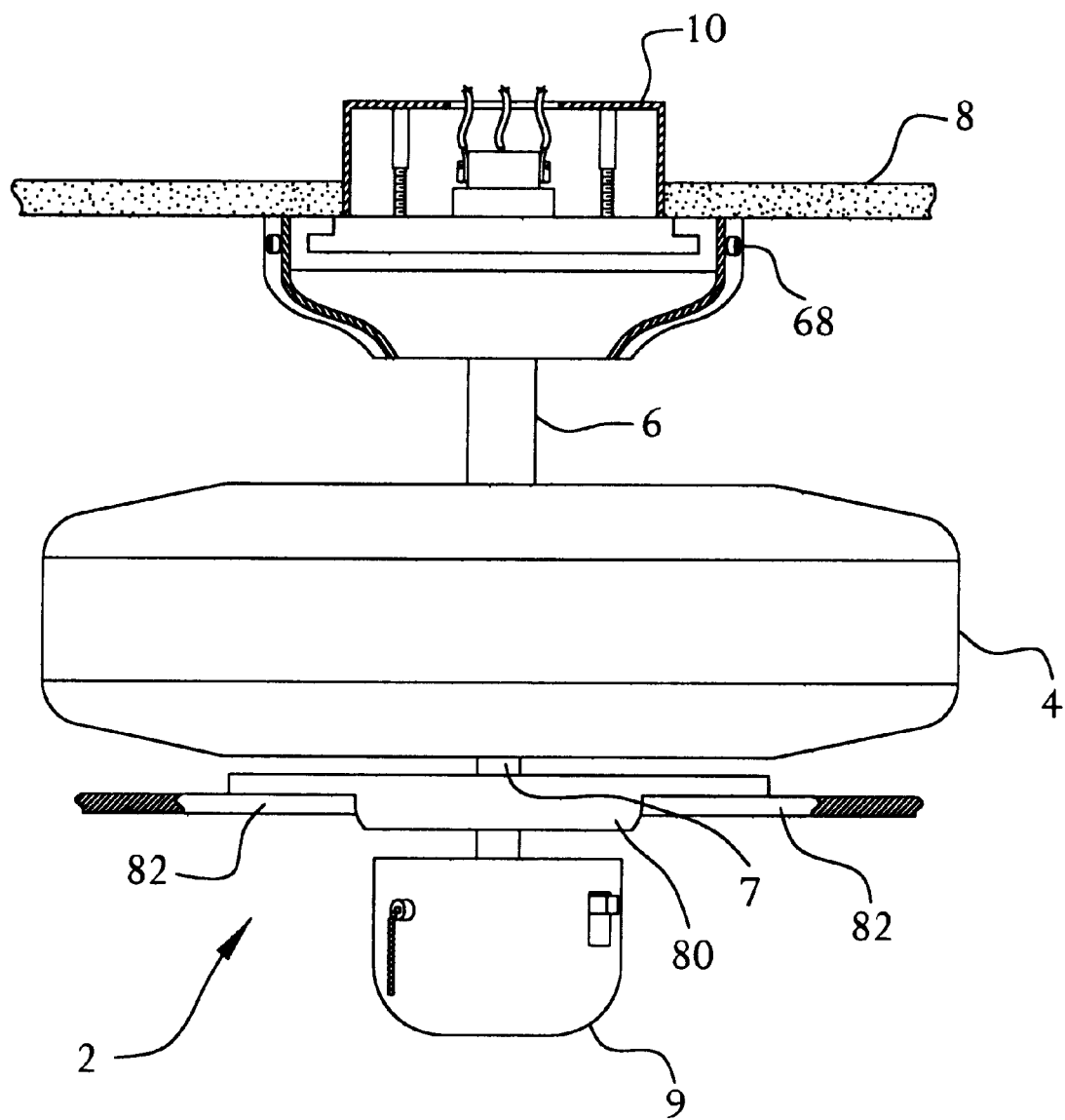
FIG. 1 is an elevation view of a ceiling fan according to the present invention.

In the drawings, where like numerals indicate like elements, a ceiling fan having the features of the present invention is generally indicated by the numeral 2. Many of the fan elements are conventional, the particular type or design of these conventional elements not being material to the invention. These conventional elements include the drive housing 4 that encloses the drive motor (not visible in any of the drawings), the down rod connecting shaft 6 which provides a conduit for electrical wires, the bell 14 that covers the ceiling cut-out, the drive shaft 7, and the switch housing 9. The features that are unique are the quick connect device and the articulating blade assembly described below.

Quick Connect Device

Figure 2:
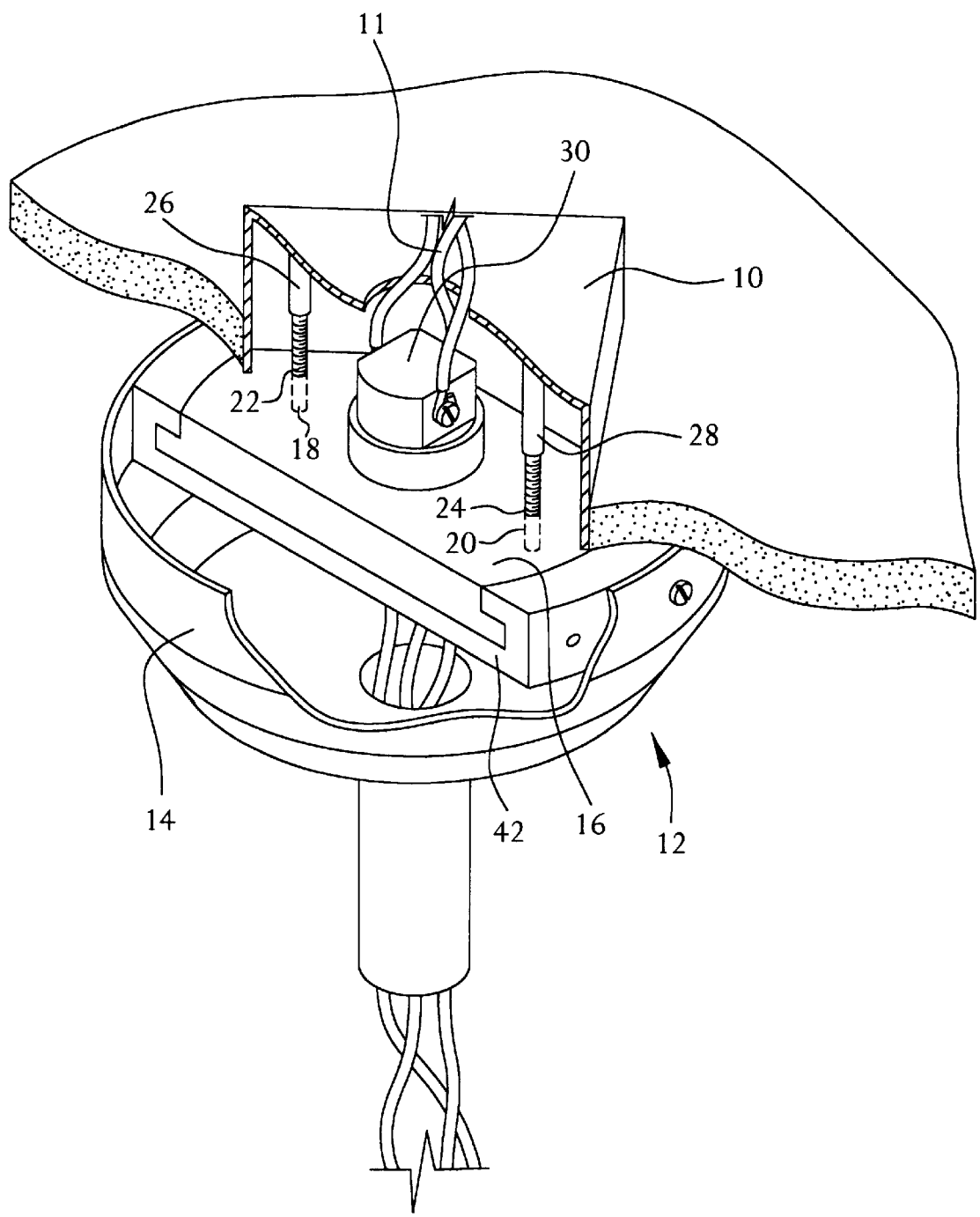
FIG. 2 is a perspective, partial section view of the quick connect device of the present invention.

A feature of the easily installed fan of the present invention is a quick connect device by which the fan is hung from the ceiling 8 and connected to an electrical supply. As shown in FIG. 1, an electrical junction box 10 is recessed in the ceiling. The junction box 10 is of the type that supports a ceiling fan and houses the electrical wires. A general characteristic of a ceiling fan junction box is that it has some type of reinforced screw receptacles, such as threaded metal blocks or threaded shoulder rivets, to receive screws attaching the fan to the box. U.S. Pat. Nos. 5,762,223 and 5,860,548, both to J. Russell Kerr, Jr., describe exemplary boxes of this type, and a box sold by Angelo Fan Brace, LLC. under the trade name SAF-T-BOX Model 1050 is an example of an electrical junction box that can be used with the present invention. The box may be fastened directly to a ceiling joist or be mounted between joists on a hanger. The quick connect device 12 (shown in FIG. 2) is used to connect the electrical box 10 and the fan's bell 14, and the electrical supply wires to the fan, as described below.

FIGS. 2 to 11 show details of the quick connect device. The quick connect device includes a receptacle plate 16 that will attach to the electrical box. The receptacle plate has two through holes 18, 20 to pass through two threaded screws 22, 24 that are received by the box's internally threaded shoulder rivets 26, 28 to attach the plate to the box. The screw and rivets secure the receptacle plate to the electrical box and provide adequate support and rigidity to sustain the weight and torque of a ceiling fan.

In an alternate embodiment, not shown but easily understood from the previous paragraph, the receptacle plate 16 has a pair of key slots in place of the through holes. The screws 22, 24 are initially threaded part way into the rivets 26, 28, and the key slots of the receptacle plate are aligned with barrel of the screws. Thereafter, the receptacle plate 16 is rotated to move the screws into the slots and the screws are tightened to secure the plate 16 to the box 10. Any configuration of the receptacle plate that provides the same function is contemplated as another possible alternative embodiment.

The receptacle plate 16 holds an electrical receptacle; in the depicted embodiment it is a conventional three-prong receptacle 30. Electrical wires 11 are connected to the terminals of the receptacle 30 to supply electricity to the fan.

Figure 3:
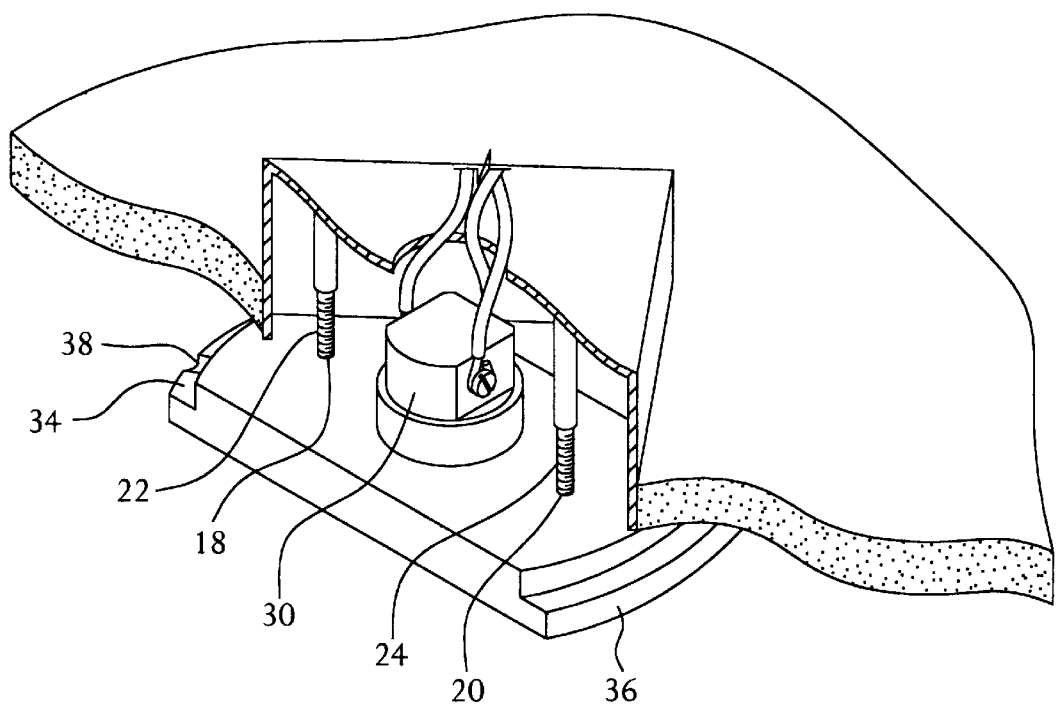
FIG. 3 is a perspective view of a receptacle plate of the quick connect device of FIG. 2.
Figure 4:
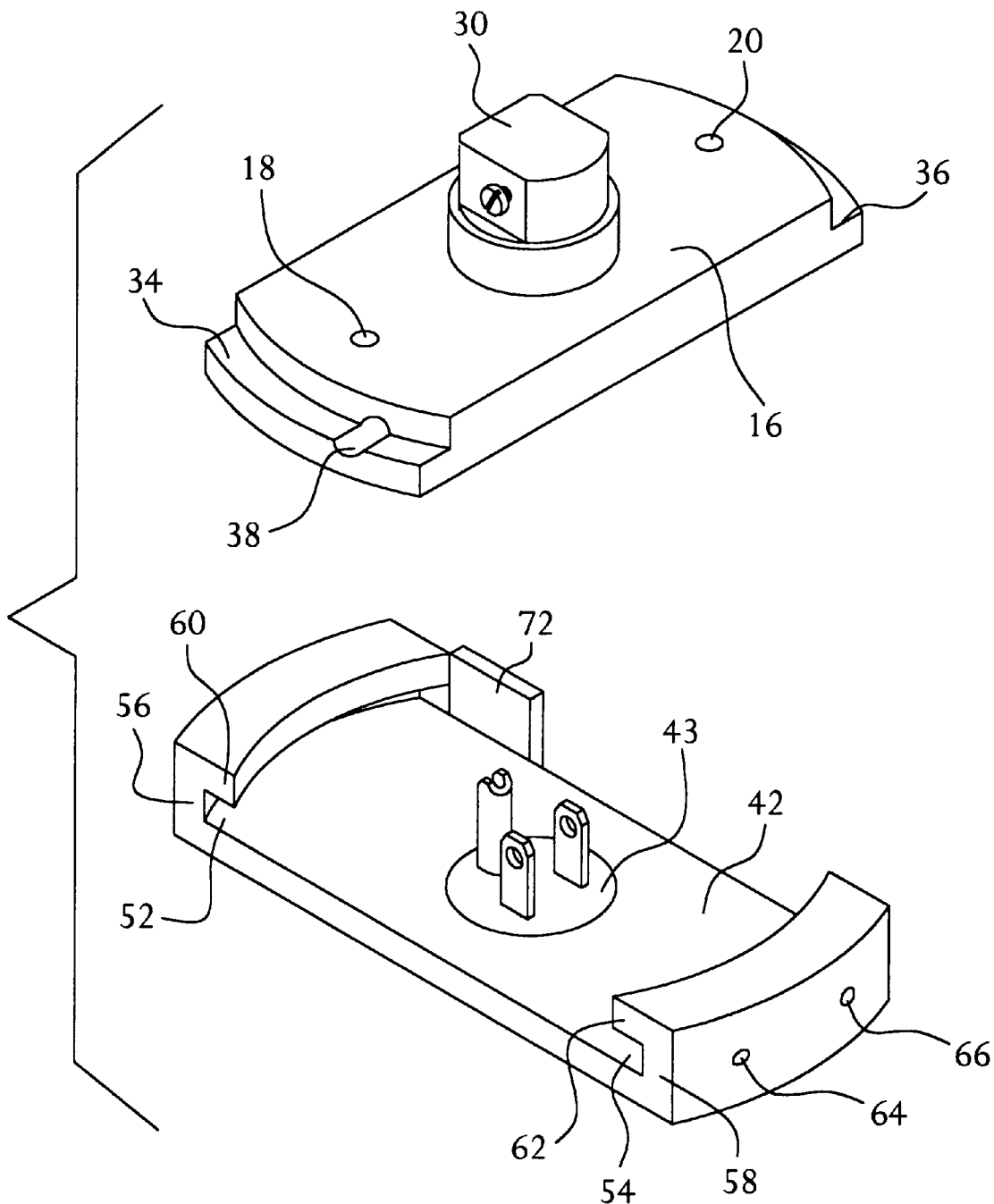
FIG. 4 is a exploded view of the quick connect device of FIG. 2.

Referring now to FIGS. 3 and 4, the upwardly facing side of the receptacle plate 16 is cut back to form a flange 34, 36 extending from the downwardly facing side of each opposite end of the plate. A bore 38, 40 (item 40 shown in FIG. 10) is drilled in the top surface of each of the flanges 34, 36 and extends into the main body of the receptacle plate, forming a cut-out in the flange and hollow cylindrical cavity in the main body, as shown in FIG. 4. The purpose of the bores is explained below.

Figure 8:
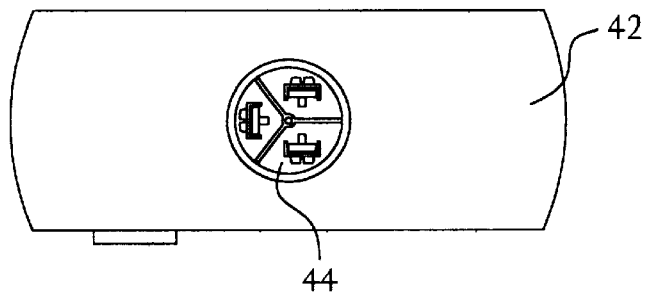
FIG. 8 is another bottom plan view of the plug plate of the quick connect device.
Figure 9:
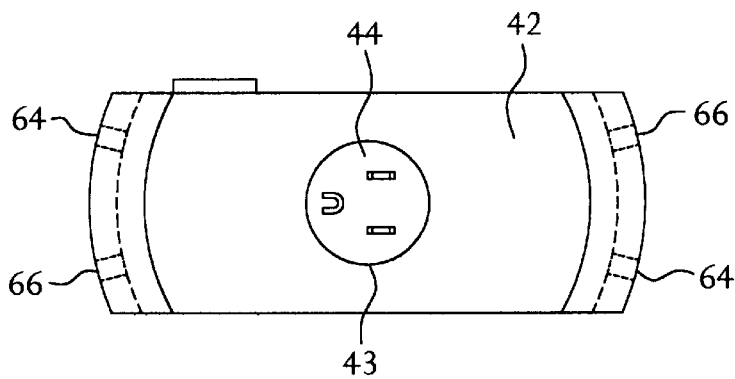
FIG. 9 is a top plan view of the plug plate of the quick connect device of the present invention.
Figure 10:
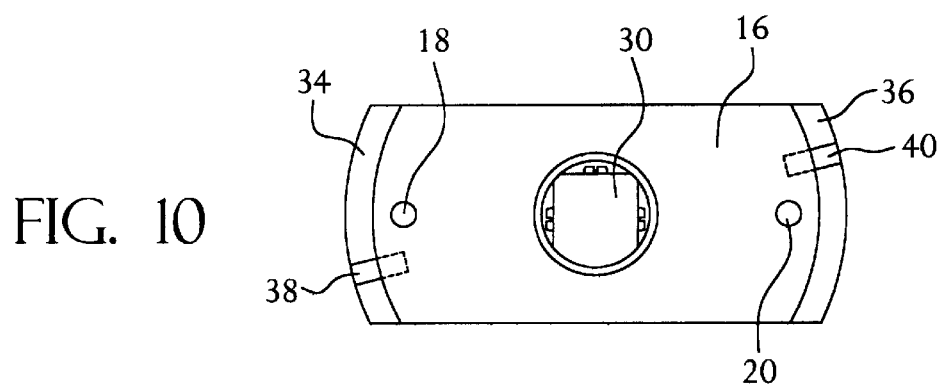
FIG. 10 is a top plan view of the receptacle plate of the quick connect device of the present invention.
Figure 11:
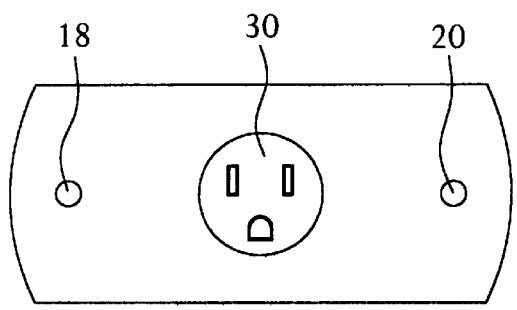
FIG. 11 is a bottom plan view of the receptacle plate of the quick connect device of the present invention.

Referring to FIGS. 4, 8 and 9, the quick connect device 12 also includes a plug plate 42 that will attach to the bell. The plug plate holds a conventional cylindrical three-prong plug 44 that is secured to the plate 42 in a fashion that enables the plate to rotate around to the plug (or the plug to rotate inside the plate). In the depicted example, the plug plate 42 has a central chamber 43 to hold the cylindrical body of the plug. Most of the central chamber has a slightly larger diameter than the diameter of the plug, which enables the plug to rotate within the chamber. At the upwardly facing side of the plug plate 42, however, the chamber 43 (shown in FIG. 9) has a diameter slightly smaller than the diameter of the plug, thereby forming a ridge that abuts the face of the plug and prevents the plug from being pulled out of the chamber from the upwardly facing side of the plug plate.

Figure 7:
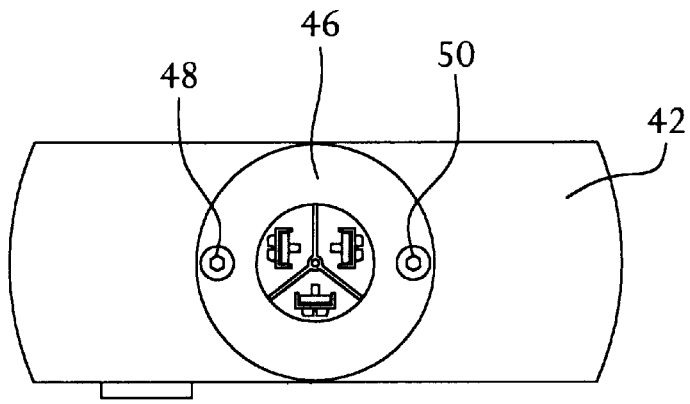
FIG. 7 is a bottom plan view of the plug plate of the quick connect device.

As shown in FIG. 7, a retaining ring 46 is attached to the downwardly facing side of the plug plate 42. The retaining ring 46 has a central opening to pass through electrical wires from the fan. The retaining ring 46 is fixed to the plug plate, in this embodiment by a pair of screws 48, 50. This configuration enables the plug plate to rotate relative to the plug about an axis normal to the upwardly facing side of the plug plate.

At each end of the plug plate is a latch slot 52, 54 defined by the end walls 56, 58 of the plate extending upwardly (as illustrated in FIG. 4) and reflecting back over the plate top walls 60, 62 extending inwardly from the end walls 56, 58. The latch slots 52, 54, are shaped and sized to receive the flanges 34, 36 of the receptacle plate.

Figure 6:
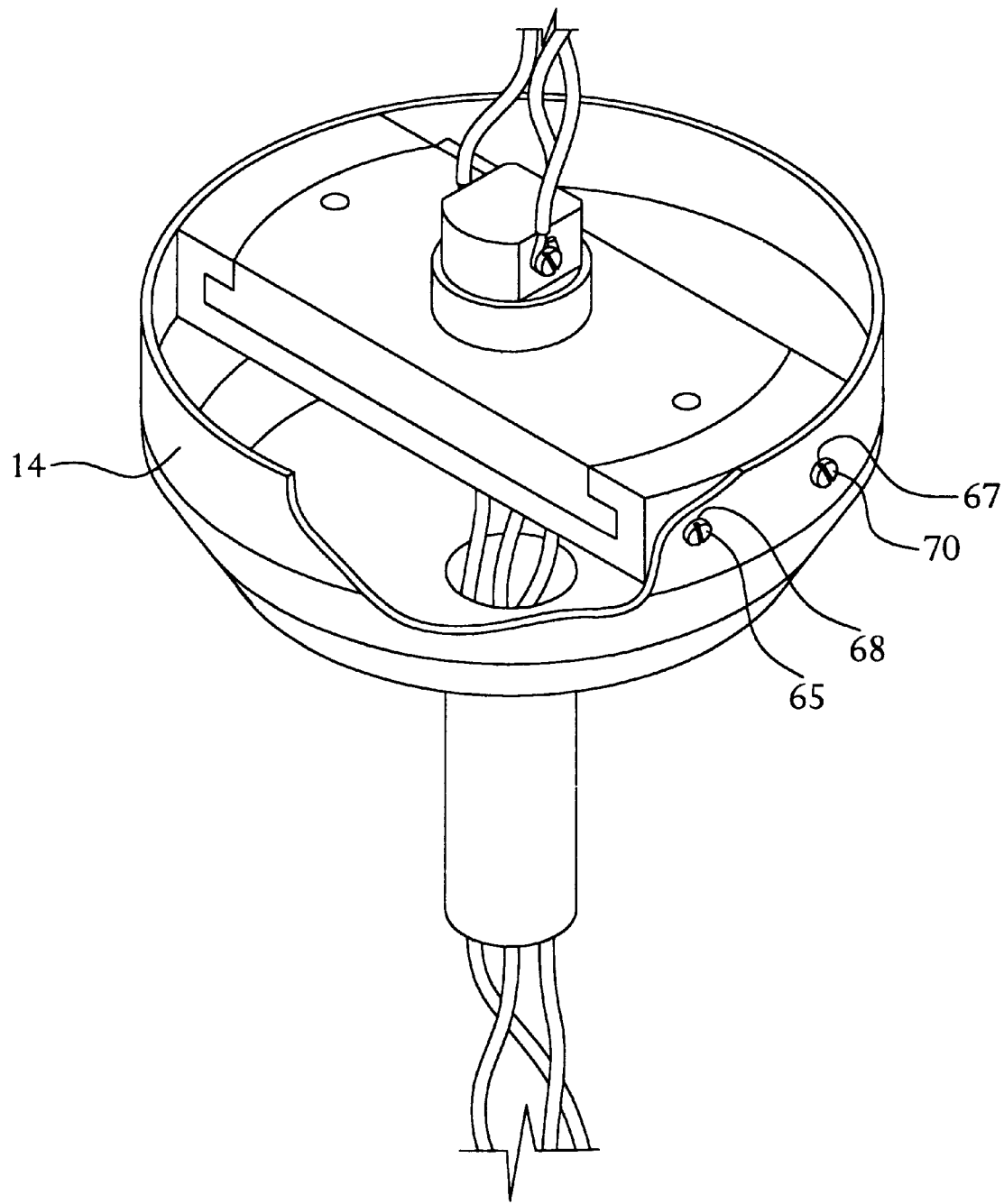
FIG. 6 is a perspective view of a quick connect device of the present invention attached to a ceiling fan bell.

The plug plate 42 has two pairs screw holes 64, 66 (shown in FIG. 9) to fasten the plug plate to the fan bell 14. Each pair of screw holes 64, 66 has one of the holes formed in each wall 56, 58. Each pair of screw holes are positioned so that the individual holes of the pair are positioned on opposite sides of the plug. As illustrated in FIG. 6, the fan's bell 14 also has two pairs of screw holes 65, 67 that align with the plug plate's screw holes 64, 66, respectively, when the plug plate is properly positioned in the bell. The second hole (not shown) of each pair of screw holes 65,67 is located diametrically opposite the corresponding hole 65, 67 shown in FIG. 6. A first pair of screw holes 65 receive screws 68 which extend through the fan bell and into the plug plate screw holes 64 and secure the plug plate in the fan's bell.

When the receptacle plate and the plug plate are rotated into their latched position (as shown in FIG. 6 and described below) the second set of plug plate screw holes 66 align with the receptacle plate bores 38, 40. Once the two plates are finally aligned, the second set of screw holes 66 in the plug plate and the corresponding second set of screw holes 67 in the bell receive screws 70 which extend through the bell, through the end wall, and into the receiving slot where they are received by the semi-cylindrical bores and into the receptacle plate cylindrical cavity.

The plug plate may, and preferably will, include a stop 72 along one side of the receptacle plate to facilitate alignment of the plug plate and the receptacle plate, as described below.

Fan Installation with the Quick Connect Device

The ceiling fan is installed by the following steps. In a preferred embodiment the fan is expected to be sold with the plug plate installed in the fan bell and with the fan's electrical supply wires already connected to the proper terminals of the plug. The receptacle plate will be included with the fan, but as an unattached item.

The first step is to connect the wires 11 from the electrical supply to the corresponding terminals of receptacle 30 in the receptacle plate 16. The receptacle plate 16 is then attached to the electrical box 10 by the screws 22, 24.

Figure 5:
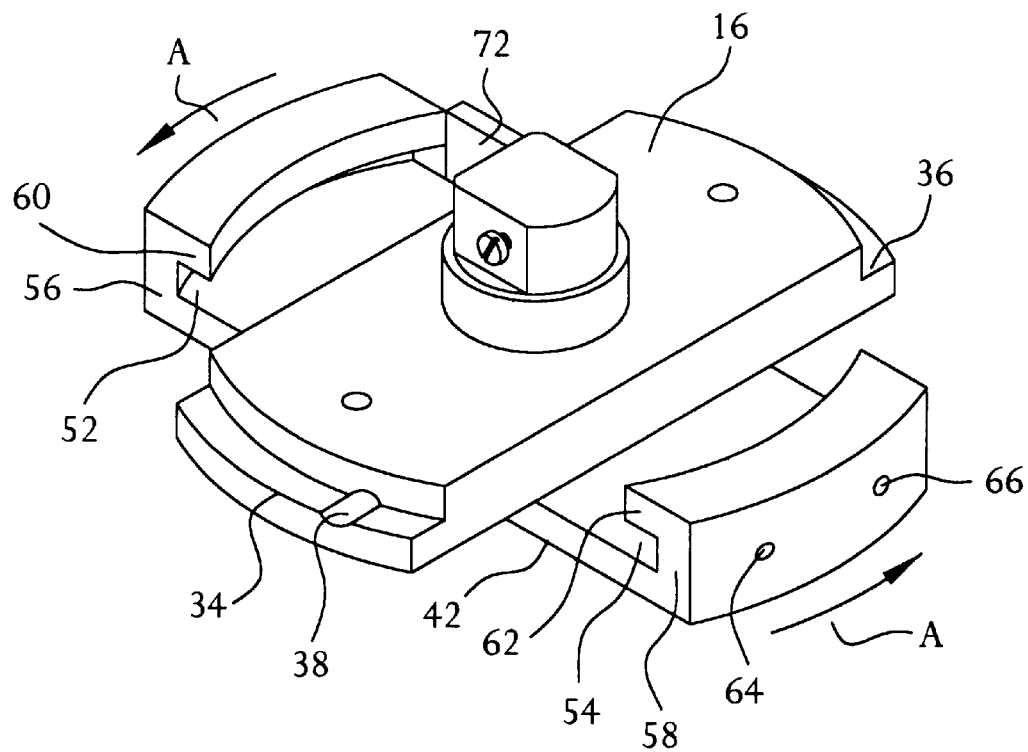
FIG. 5 is a perspective view of the quick connect device of FIG. 2 after initial engagement between the receptacle and plug.

Next, the fan is lifted to the junction box and the plug is rotated to a position where it can be inserted into the receptacle, as in FIG. 5. In this position, the plug plate will be across the receptacle plate at a sufficient angle that the flanges of the receptacle plate do not contact the top wall of the plug plate. The fan is then raised to push the plug prongs fully into the receptacle, and the fan is then rotated (as shown by arrow A in FIG. 5) to align and interlock the two plates, that is, the flanges in the receptacle plate are in the latch slots of the plug plate. If the plug plate has a stop 72, the fan is rotated until the receptacle plate contacts the stop, at which position the respective screw holes 64, 66 on the plug plate 47 will be aligned with bores 38, 40 on the receptacle plate 16. The screws 70 are then tightened to fix the receptacle plate to the plug plate. The screws 70 hold the plates securely together and prevent the plates from separating regardless of the direction of the fan blades.

Thus, the required time and difficultly of hanging and electrically connecting the fan is greatly reduced, and the operation can be easily done by one person.

Alternative Embodiments of the Quick Connect

Alternative embodiments of the quick connect device may be made by reversing some of the parts, such as a fixed plug and a rotatable receptacle. Any operable permutation of the plates and the rotatable plug/receptacle is considered to be within the scope of the present invention. Further, the preferred embodiment of the invention discloses a plug plate and a receptacle plate having a generally rectangular main body with curved ends, as illustrated, but the invention is not intended to be limited to that configuration.

In some alternative embodiments, the quick connect device does not include a plug/receptacle type of electrical connection. Referring to FIGS. 12–15, the quick connect device includes a first plate 200 and a second plate 202, and each plate 200, 202 includes electrical contact strips 204 in the face of the plate 200, 202 that is adjacent to the other plate when the plates are connected. Each contact strip 204 is slightly bowed outwardly from the face of the plate to provide a good electrical contact between the corresponding strips. The first plate strips 204a connect electrically to a power supply (not shown) in the electrical junction box and the second plate strips 204b connect electrically to the fan motor.

The second plate 202 also includes a key 206 centrally positioned on the face 208 of the second plate 202. The key 206 is formed by a stem 210 extending from the plate face 208 and a head 212 at the end of the stem 210. The head 212 may have an oval or oblong shape. The first plate 200 has an key slot opening 214 that has a shape corresponding to the shape of the key head 212. The key stem 210 has a height equal to or slightly greater than the thickness of the first plate 200. When the key 206 is inserted into the key slot 214 and the second plate rotated to turn the key head 212 transverse to the key slot 214, the first plate 200 and the second plate 202 are locked in proximity to each other to establish and preserve an electrical connection between the first plate strips 204a and the second plate strips 204b.

Figure 12:
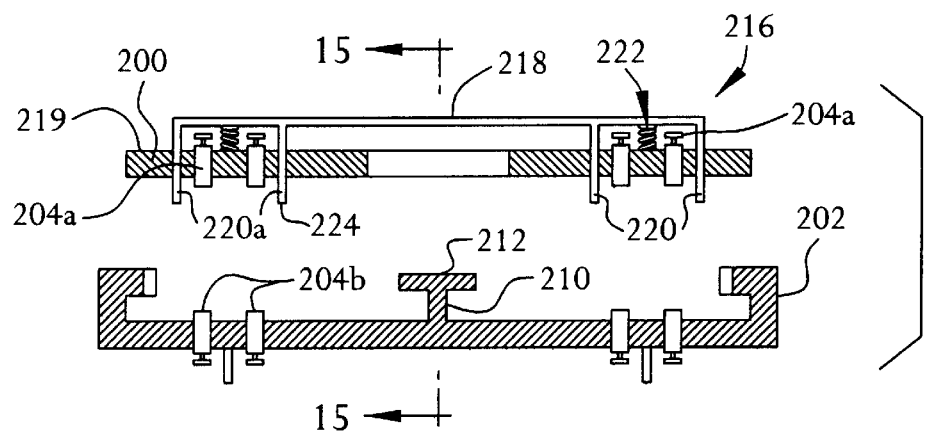
FIG. 12 is a side cross-sectional view of a first and a second plate of another embodiment of a quick connect device of the present invention.
Figure 13:
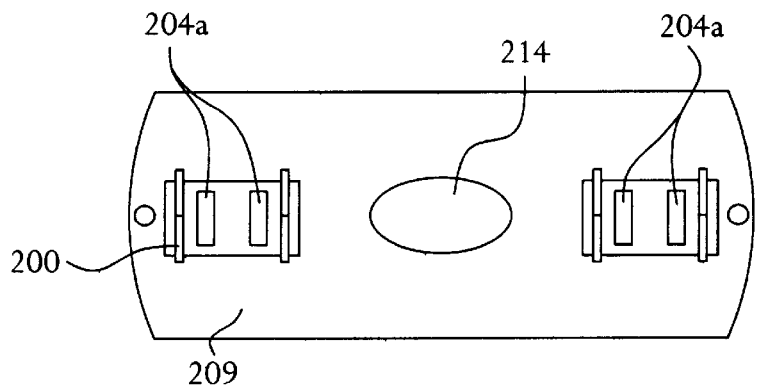
FIG. 13 is a bottom plan view of the first plate of the embodiment of FIG. 12.
Figure 14:
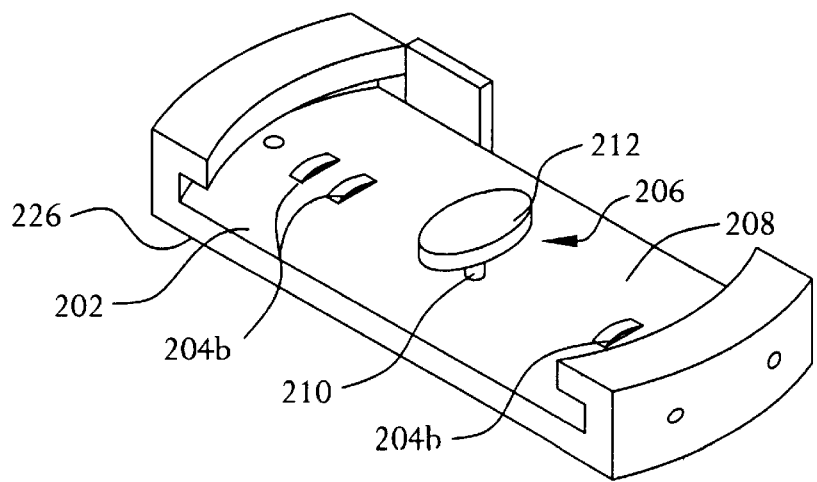
FIG. 14 is a top perspective view of the second plate of the embodiment of FIG. 12.

Referring to FIGS. 12 and 13, the first plate 200 may also include a spring loaded shock protector 216 to prevent an installer from unintentionally touching the contact strips 204a after the first plate 200 has been electrically connected to the junction box. The shock protector 216 includes a base 218 and divider walls 220 extending perpendicularly from the base 218. The base 218 is positioned on the back side 219 of the first plate 200, opposite the plate's face 209. The divider walls 220 extend through and past the first plate 200 a distance sufficient to prevent an average adult's finger from engaging the strips 204a.

Figure 15:
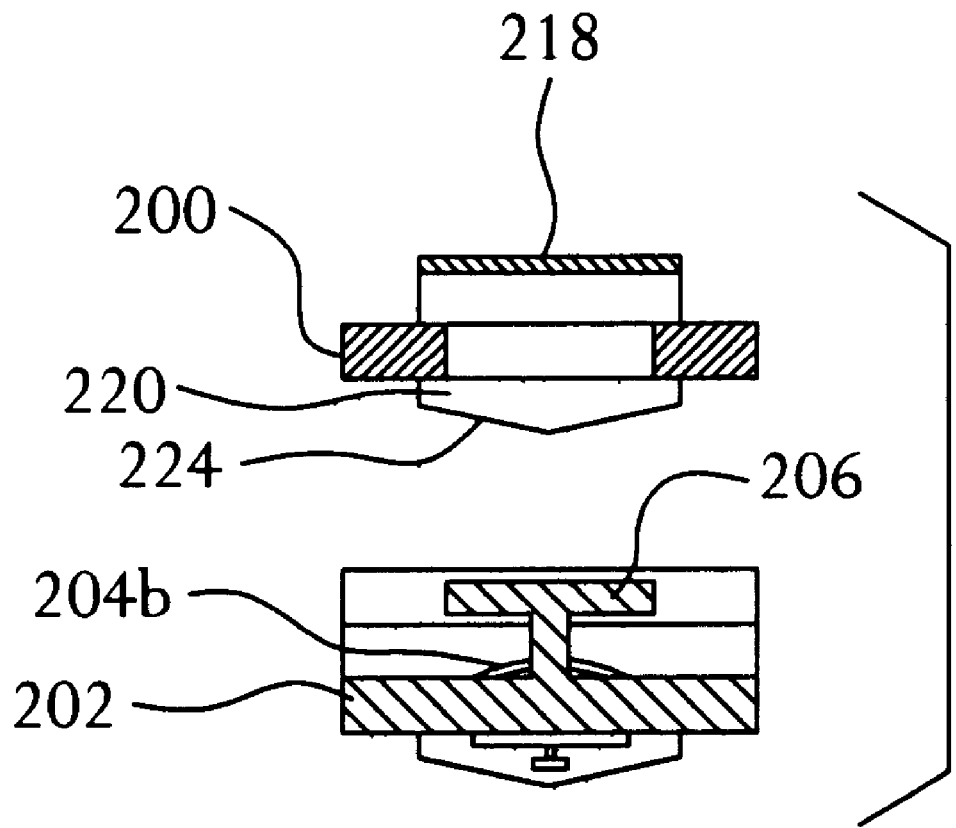
FIG. 15 is a sectional view of the first and second plate of the embodiment of FIG. 12 taken along line 15—15.

A pair of coil springs 222 are attached to the back side 219 of the first plate 200 and to the base 218 of the shock protector. When the springs 222 are relaxed, the dividers 220 are in an extended position away from the first plate 200. Referring to FIG. 15, the dividers 220 have an end 224 that is sloped to present a "V"-shaped tip. When the key 206 is inserted into the slot 214 and the second plate 202 is rotated to engage the contact strips 204, a side 226 of the second plate 202 engages the sloped end wall 224 and forces the shock protector 216 away from the back side 219 of the first plate 200, stretching the springs 222. When the first and second plates 200, 202 are separated, for example to uninstall the fan, the springs 222 contract and the shock protector 216 is pushed back towards the back side 219 of the first plate 200. In this manner, a person removing the fan will not be able to accidently touch the contact strips. In all other regards, the embodiment illustrated in FIGS. 12 to 15 is identical to the embodiment described in FIGS. 2 to 11.

Figure 16:
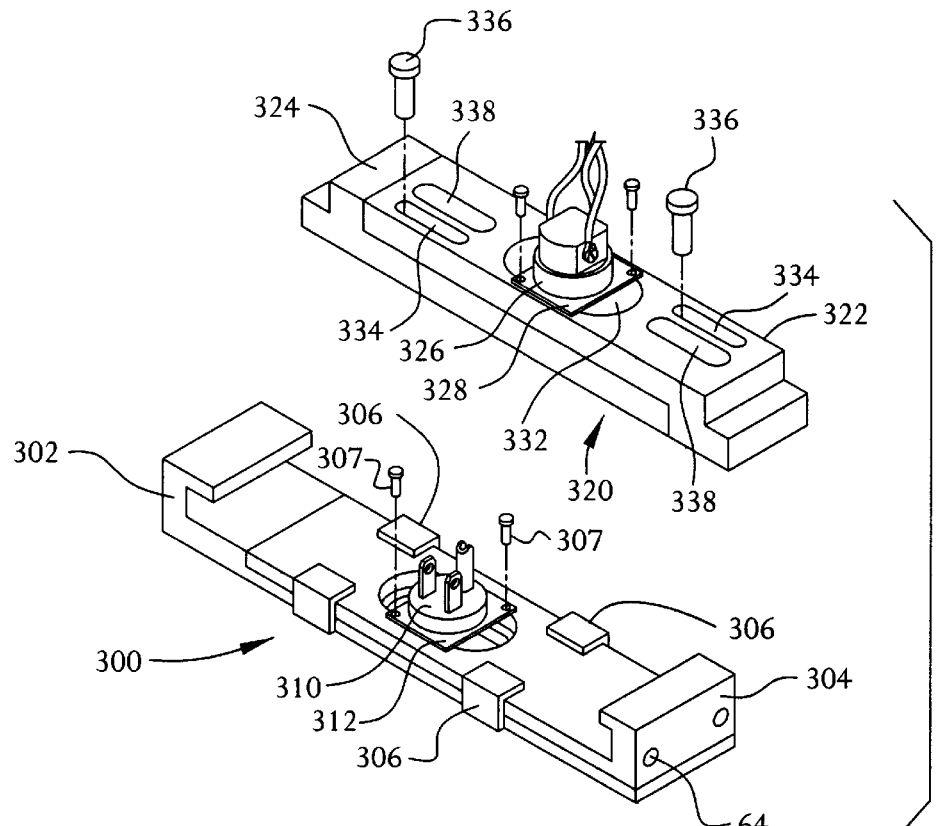
FIG. 16 is a perspective view of a first and a second plate of another embodiment of a quick connect device of the present invention.
Figure 17:
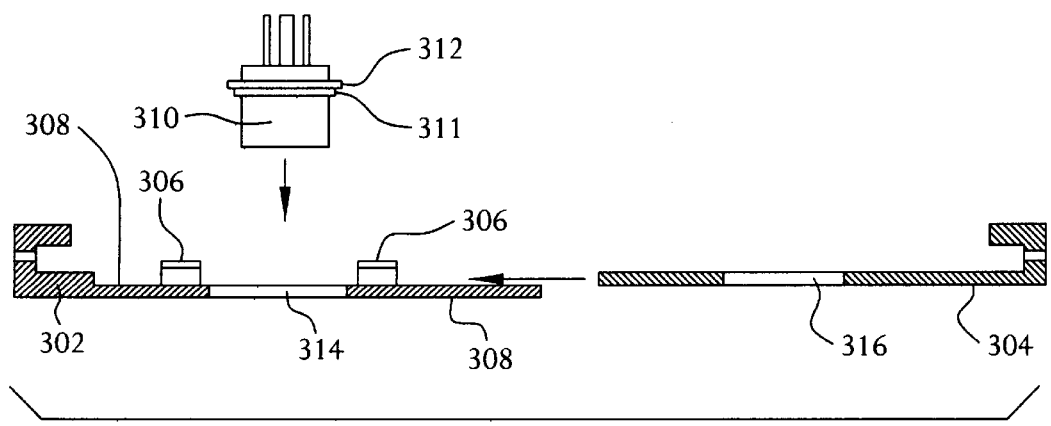
FIG. 17 is a side view of the second plate of the embodiment of FIG. 16.
Figure 18:
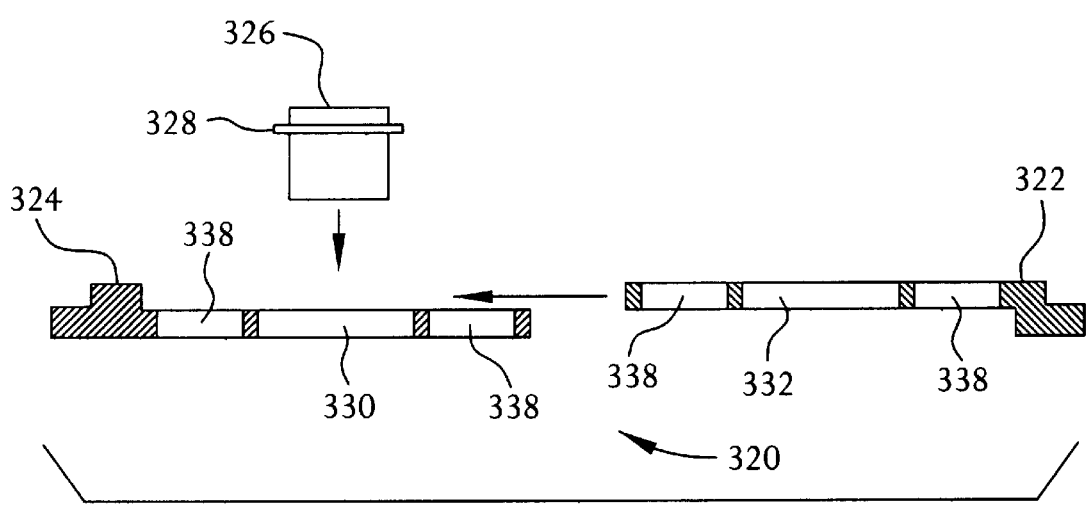
FIG. 18 is a side view of the first plate of the embodiment of FIG. 16.

FIGS. 16, 17 and 18 illustrate how the embodiments of FIGS. 2–15 may be enhanced to accommodate multiple size fan bells. This feature would typically be used in quick connect devices that are retrofit to existing ceiling fans. As illustrated, the second or plug plate 300 includes a bottom section 302 and a top section 304. A plurality of tabs 306 are attached and extend from opposing sides of the bottom section 302. The bottom section 302 includes a cut out section 308. The top section 304 has a height that snugly fits into the cut-out section 308 as guided by the tabs 306.

This embodiment includes a plug 310 that has a collar 312 and a lip 311 positioned thereabout. Both the bottom section 302 and the top section 304 include a central opening 314, 316, which may be rectangular or oblong. The central opening 314 of the bottom section 302 has a width generally equal to the diameter of the plug 312 while the central opening 316 of the top section 304 has a width equal to the diameter of the lip 311. In this manner, the plug 310 resides within the central openings 314, 316 with the lip 311 resting on the bottom section 302 and the collar 312 resting on the top section 304.

Depending upon the size of the fan bell, the top and bottom sections 302, 304 may be pulled apart or pushed together. As the second plate 300 is fit into the fan bell, the first set of screws 68 may be inserted through the fan bell and into the receiving holes 64 to fix the second plate to the fan bell, as described above. Once the second plate 300 is fixed to the fan bell, the plug 310 can be adjusted to the center of the second plate, as allowed by the central openings 314, 316 and thereafter the collar 312 fixed to the top section 304 by a set of screws 307. The collar 312 is attached to the plug 310 in a manner that permits the second plate 300 to rotate about the plug 310.

The first or receptacle plate 320 includes a top section 322 and a bottom section 324. Each section 322, 324 includes a cut-out. When fully engaged, the two sections form a unit equivalent to the receptacle plate described above. This embodiment includes a receptacle 326 having a collar 328 thereabout. The receptacle 326 resides in a opening 330, 332 in each section 322, 324, respectively, with the collar 328 resting on the top section 324. Each receptacle plate section 322, 324 includes a first set of slots 334 that receive screws 336 for fixing the two sections 322, 324 to each other once the sections have been sized to correspond to the size of the plug plate sections 302, 304. Each receptacle plate section 322, 324 also includes a second set of slots 338 that receive screws (not shown) for attaching the receptacle plate to the electrical junction box once the sections 322, 324 have been sized and fixed to each other.

This embodiment is otherwise identical to the first embodiment described above in all material respects.

Figure 19:
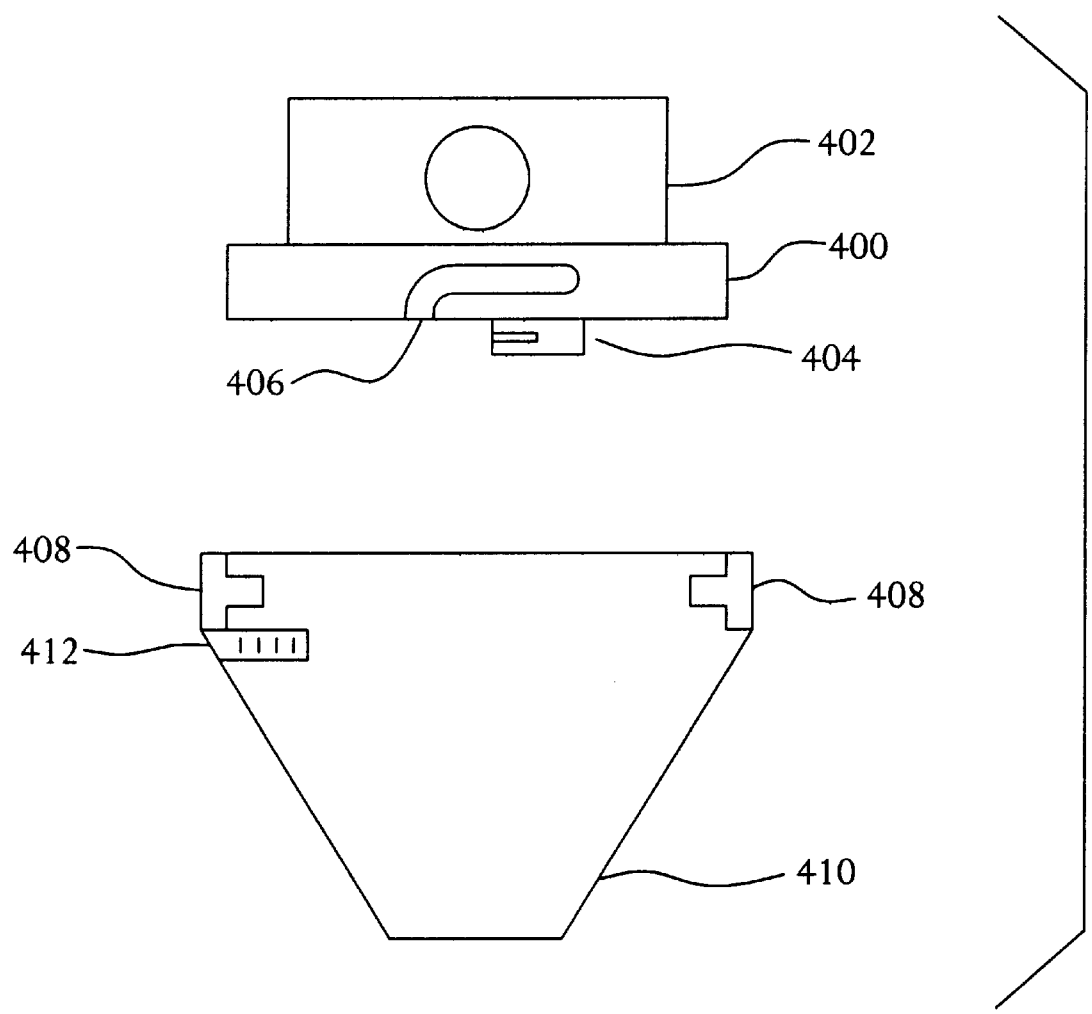
FIG. 19 is a side view of another embodiment of a quick connect device of the present invention.

FIG. 19 illustrates another alternate embodiment of the quick connect device. In this embodiment, the quick connect device includes a disk 400 that is attachable to an electrical junction box 402. The disk 400 carries a first electrical contact element 404. The first contact element 404 is wired to electrical supply in the junction box 402. The first contact element 404 may be either the plug or the receptacle of a plug/receptacle connection or a contact strip. The disk 400 includes a pair of receiving slots 406 that are positioned on opposing sides of the disk 400 and have a generally "L" shaped configuration.

The quick connect device also includes a pair of locking pins 408 mounted on the inside of a fan bell 410. The locking pins 408 are mounted on opposing sides of the fan bell 410 corresponding to the receiving slots. A second contact element 412 is also mounted inside the fan bell 410. The second contact element 412 may be the other of the plug/receptacle connection or a second contact strip. The second contact element is positioned such that when fan bell 410 is brought to the disk 400 bring the locking pins into the receiving slots 406 and the fan bell 410 is rotated to secure the locking pins 408 in the receiving slots 406, the second contact element 412 engages the first contact element 404. Once the fan bell 410 is mounted to the disk 400 a pair of set screws may be used to secure the fan bell 410 to the disk 400 to prevent rotational movement between the two.

Figure 20:
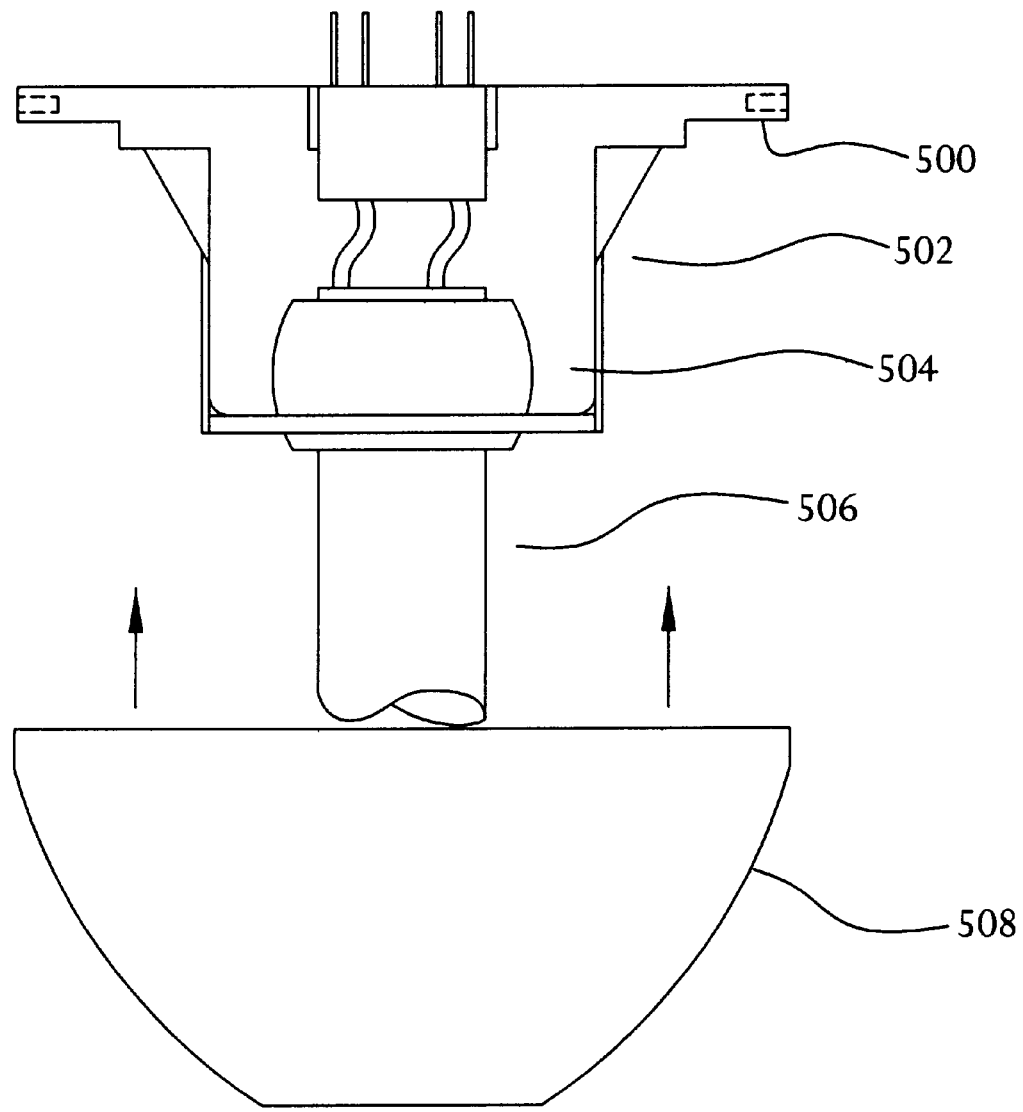
FIG. 20 is a side view of another embodiment of a quick connect device of the present invention.

FIG. 20 illustrates an alternate embodiment for connecting a plug plate 500 to the fan. A bracket 502 couples the plug plate 500 to a ball 504. The bracket 502 may be connected to the plug plate 500 or formed integrally therewith. The bracket 502 serves as a socket allowing the ball to rotate. A down rod 506 is connected to the ball 504. The down rod 506 connects to a motor housing (not shown). Once the ball 504 has been secured in the bracket 502, a fan bell 508 may be installed. The fan bell 508 may be attached to the plug plate 500, the electrical junction box or the ceiling. The bracket may also be used in conjunction with an embodiment incorporating the contact strips.

Fan Blade Assembly

A second feature of the easily installed ceiling fan of the present invention is its articulating fan blade assembly. The blade assembly allows the blades to be hung from the drive ring in a collapsed vertical orientation before hanging the fan from the ceiling, and then easily snapped into the extended operating position. A related advantage is that the blades can later be lowered while still attached to the drive ring for cleaning and maintenance.

Referring to FIG. 1, the ceiling fan 2 has a drive shaft 7 connecting the fan motor to a drive ring usually called the blade hub 80. A plurality of fan blades 82 is positioned equidistantly about the hub 80.

Figure 21:
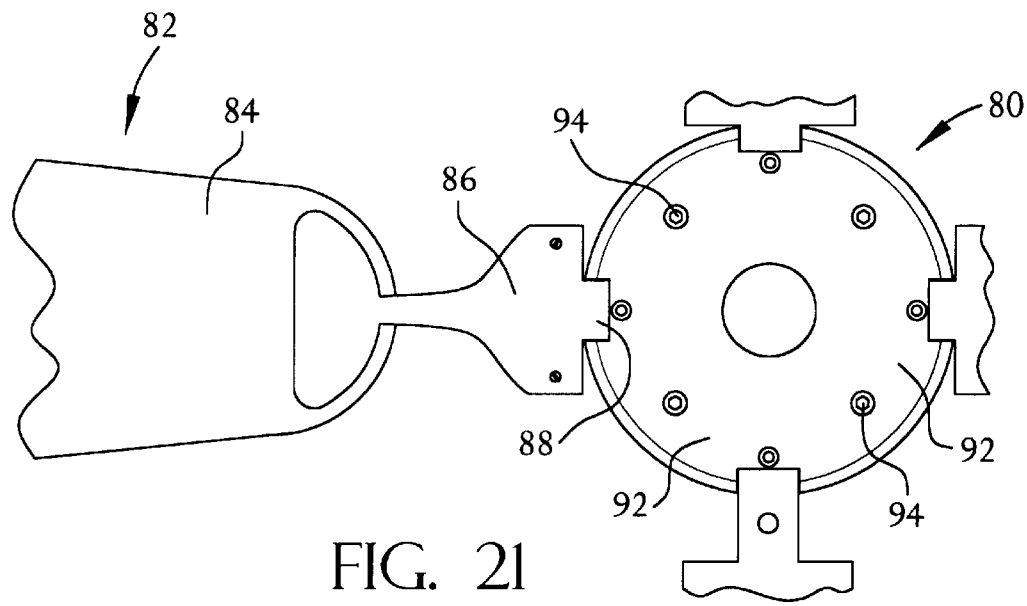
FIG. 21 is a bottom plan view of an articulating fan blade assembly of the present invention.
Figure 22:
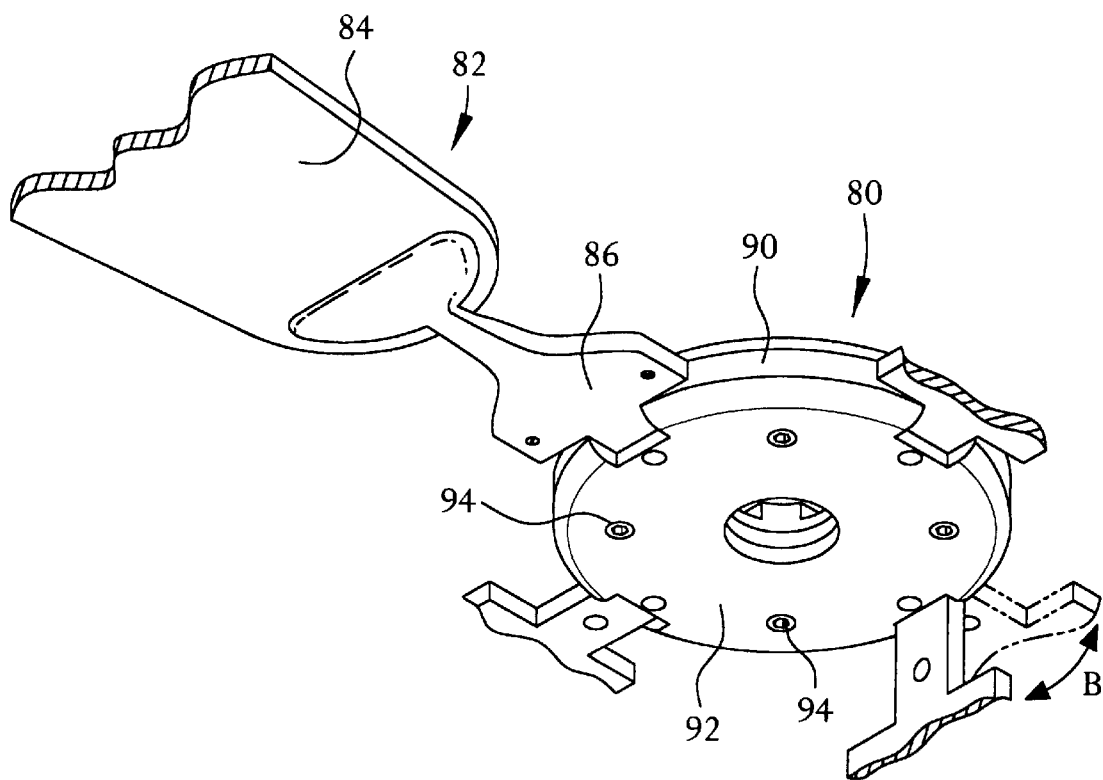
FIG. 22 is a perspective view of the articulating fan blade assembly.

In conventional fans, the blade has an airfoil portion or paddle, usually of wood or plastic construction, and a decorative metal mounting bracket attached to the root end of the paddle. The mounting bracket is attached by screws to the hub. When the blade is mounted to the hub, it is in its fixed operating position (some may permit minor adjustments to the blade angle). As shown in FIGS. 21 and 22, the fan blades 82 of the present invention also have a paddle 84 and a mounting bracket 86, but the mounting bracket connects differently to the hub, as described below.

The hub 80 includes a top plate 90 (from the perspective of FIG. 22 and shown in plan in FIGS. 23 and 24) and a bottom plate 92 (shown in plan in FIGS. 21, 25 and 26). The two plates 90, 92 are connected by screws 94. Referring to FIG. 24, the top plate 90 includes a receiving slot 96 for each of the fan blades 82.

Each blade's mounting bracket has a shaft 88 that is used to connect the bracket to the hub. The shaft 88 can be integral with the bracket, or alternatively could be a separate plain metal piece that is attached to a decorative mounting bracket. The shaft terminates with a pair of retaining tabs 97 extending laterally from its end, such that the width of the shaft at the retaining tabs is slightly greater than the width of the neck portion 87 of the shaft.

The slots 96 in the hub include an opening 98 in the outer wall 100 of the top plate 90. The width of the opening 98 is substantially the same as the width of the neck portion 87 of the shaft but less than the width of the end with the retaining tabs. The portion of the slot inside the outer wall of the hub has a width substantially the same as the retaining tab end of the shaft. Thus, the reduced width of the slot opening forms a retaining ridge 102 in the hub radially inward of the slot opening 98.

With the portion of the shaft including the retaining tabs positioned within the slot, the bottom plate 92 is attached to the top plate 90. The bottom plate 90 includes, for each blade, a cutout or notch 104 corresponding in position to each slot in the top plate. The notch 104 has a width equal to the width of the shaft without the retaining tabs. When the fan blades are in an extended position (as illustrated by the bottom blades in FIGS. 21 and 24, and by the right-most blade in FIG. 22) the retaining tabs are supported by the top of the bottom plate and the fan blades may articulate downward in the direction of arrow B, as illustrated in FIG. 22. The shaft's neck is received in the bottom plate notch and the fan blades hang vertically. The slot configuration also allows the shaft to move radially back and forth along the slot.

In an alternate embodiment, the hub 80 may be a one-piece unit. As a one-piece unit, the hub 80 still includes a receiving slot 96 for each of the fan blades 82. In this embodiment, the retaining tabs 97 are spring loaded enabling the tabs 97 to be forced into the shaft 88. With the tabs 97 forced into the shaft 88, the shaft 88 is inserted into the receiving slot 96. Once the shaft 88 is within the receiving slot, the tabs 97 are forced out of the shaft by the spring thereby holding the shaft in the receiving slot.

Figure 27:
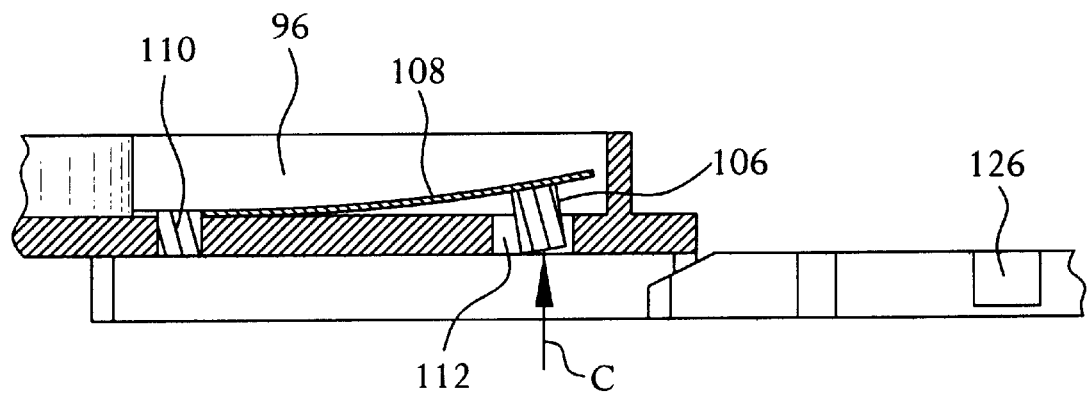
FIG. 27 is a partial elevation, section view of the drive ring and fan blade of the present invention.

Referring to FIGS. 24 and 27, the top plate 90 also includes a retaining pin 106. The retaining pin 106 is attached to a metal strip 108 that is fixedly attached to the top plate by, for example, a rivet 110. The metal strip 108 acts as a spring for the pin 106, and holds the pin in a first position extending through a hole 112 in the top plate 90 and into the slot 96. When the pin is forced in the direction of arrow C, the strip 108 allows the pin 106 to move into the hole 112. When the force is removed from the pin 106, the metal strip forces the pin 106 back into the slot 96. In a preferred embodiment, the retaining pin 106 is accessed through a hole 112 in the bottom plate 92, and can by depressed with a pen or small bladed screw driver. The shaft 86 includes a hole 126 that receives the retaining pin 106 when the fan blade is fully inserted into the slot.

To place the fan blades into their operable position, a hanging blade (illustrated in FIG. 22, lower right blade) is articulated up in the direction of arrow B. The retaining pin 106 is accessed through the hole 112 in the bottom plate and pushed out of the slot 96. In an alternate embodiment, the pin 106 includes an angled face. When the shaft 86 engages the pin 106, the shaft 86 itself forces the pin 106. The fan blade is then moved into the slot in the direction of arrow D. The shaft slides over the depressed pin until the hole 126 is in registry with the pin, and the spring 108 then forces the pin 106 into the hole 126. Once the retaining pin is secured in the receiving hole, the blade is fixed in its extended position and ready for operation. The blade can be moved back to the collapsed vertical position by depressing the pin and pulling the blade outward until the retaining tabs engage the notch of the bottom plate. The blade is then allowed to articulate downward in the direction of Arrow B.

The metal strip 108 may be replaced by a coil spring or any other element which will provide a similar function as described above.

By enabling these fan blades to be articulated between a collapsed, vertically hanging position and an extended operable position, a fan with this fan blade assembly can be installed with the fan blades attached to the hub and in a collapsed hanging position. After the fan is electrically connected and attached to the ceiling, the blades are raised and locked into the extended operating position. This blades can be lowered thereafter for easy cleaning.

Figure 28:
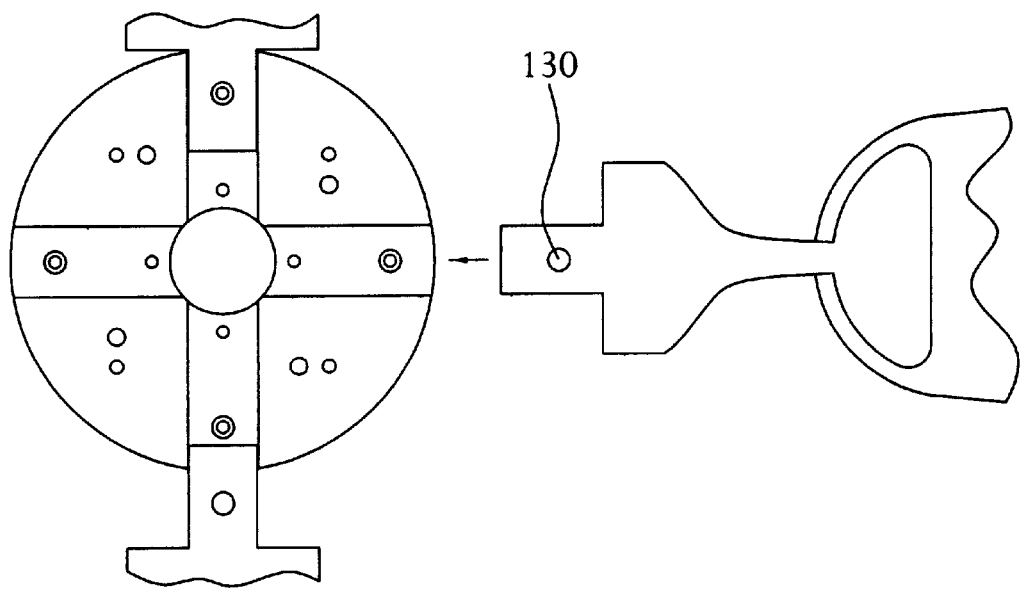
FIG. 28 is an alternate embodiment of the drive ring and fan assembly of the present invention.

Referring to FIG. 28, an alternate embodiment of the easy install fan blade assembly has fan blades with a mounting bracket shaft 130 that does not include the retaining tabs. The top plate 90 includes a slot having a width that is the same as the width of the neck 130. Since the neck 130 does not include the retaining tabs, the fan blades are completely removable from the hub 80. The fan blades of this embodiment are installed in a fashion virtually identical to the embodiment described above.

The present invention may be embodied in other specific forms. Accordingly, reference should be made to the following claims, rather than to the foregoing embodiments, to appreciate the scope of the invention.

What is claimed is:

1. A ceiling fan having a quick connect device, the device comprising:

a first plate attachable to an electrical junction box and containing a first electrical contact; and a second plate attachable to a fan and containing a second electrical contact;

the first plate rotatably coupled to the second plate;

wherein the first electrical contact is an electrical contact strip generally in a plane of a face of the first plate adjacent to the second plate and the second electrical contact is an electrical contact strip generally in a plane of a face of the second plate adjacent to the first plate;

wherein the second plate comprises a key, the key including a stem extending from the face and an oval head attached to the stem and the first plate comprises an opening having a shaped corresponding to the head to rotatably couple the first plate to the second plate.

2. A ceiling fan as in claim 1, wherein the quick connect device further comprises a lock fixing the relative position of the first plate to the second plate.

3. A ceiling fan as in claim 2, wherein the lock comprises a receiving hole in the first plate, a through hole in the second plate and a locking rod insertable into the through hole and the receiving hole.

4. A ceiling fan as in claim 1, wherein the first plate has a flange extending from each opposite end thereof, and the second plate has a latch slot at each opposite end thereof configured to receive a flange of the first plate.

5. A ceiling fan as in claim 4, wherein the quick connect device further comprises a lock fixing the relative position of the first plate to the second plate.

6. A ceiling fan as in claim 5, wherein the lock comprises a receiving hole in the first plate, a through hole in the second plate and a locking rod insertable into the through hole and the receiving hole.

7. An electrical quick connect apparatus comprising:

a first plate attachable to an electrical junction box and containing a first electrical contact; and a second plate attachable to a fan and containing a second electrical contact;

the first plate rotatably coupled to the second plate;

wherein the first electrical contact is an electrical contact strip generally in a plane of a face of the first plate adjacent to the second plate and the second electrical contact is an electrical contact strip generally in a plane of a face of the second plate adjacent to the first plate;

wherein the second plate comprises a key, the key including a stem extending from the face and an oval head attached to the stem and the first plate comprises an opening having a shaped corresponding to the head to rotatably couple the first plate to the second plate.

8. An electrical quick connect apparatus as in claim 7, wherein the first plate has a flange extending from each opposite end thereof, and the second plate has a latch slot at each opposite end thereof configured to receive a flange of the first plate.

* * * * *